United States Patent

Yamasaki et al.

[11] Patent Number: 5,914,827
[45] Date of Patent: Jun. 22, 1999

[54] METHOD AND APPARATUS FOR IMPLEMENTING A NOISE GENERATOR IN AN INTEGRATED CIRCUIT DISK DRIVE READ CHANNEL

[75] Inventors: Richard Yamasaki, Torrance; David R. Gruetter, Fullerton, both of Calif.

[73] Assignee: Silicon Systems, Inc., Tustin, Calif.

[21] Appl. No.: 08/608,296

[22] Filed: Feb. 28, 1996

[51] Int. Cl.$^6$ .................................................. G11B 20/24
[52] U.S. Cl. .................................. 360/27; 360/46; 360/68
[58] Field of Search .............................. 330/60, 149, 260; 331/78; 360/46, 53, 65, 67, 112, 113

[56] References Cited

U.S. PATENT DOCUMENTS

| 5,121,263 | 6/1992 | Kerwin et al. |
| 5,172,072 | 12/1992 | Willems et al. ........................ 330/149 |
| 5,243,303 | 9/1993 | Murata et al. ............................. 331/78 |
| 5,585,974 | 12/1996 | Shrinkle .................................... 360/46 |

OTHER PUBLICATIONS

Kerwin, G. J., Galbraith, R. L and Coker, J. D., "Performance Evaluation of the Disk Drive Industry's Second-–Generation Partial Response Maximum Likelihood Channel," IEEE Transactions on Magnetics, Vol. 29. No. 6, Nov. 1993, pp. 4005–4008.

Coker, J. D., Galbraith, R. L. and Kerwin, G. J., "Magnetic Characterization Using Elements of a PRML Channel," IEEE Transactions on Magnetics, Vol. 27, No. 6, Nov. 1991, pp. 4544–4548.

Coker, J. D., Galbraith, R. L., Kerwin, G. J., Rae, J. W. and Ziperovich, P. A., "Implementation of PRML in a Rigid Disk Drive," IEEE Transactions on Magnetics, vol. 27, No. 6, Nov. 1991, pp. 4538–4543.

*Primary Examiner*—Aristotelis M. Psitos
*Assistant Examiner*—K. Wong
*Attorney, Agent, or Firm*—W. Daniel Swayze, Jr.; Wade James Brady, III; Richard L. Donaldson

[57] ABSTRACT

A method and apparatus for implementing a noise generator in an integrated circuit read channel to optimize the performance of the signal channel. In the preferred embodiment resistors are used to generate noise. The noise source is buffered and the noise signal passes through a pre-amplifier stage. A differential current digital-to-analog converter controlled multiplier cell controls the amplitude of the noise signal. A switch connects the noise signal to a differential current output buffer, which is coupled to a signal channel.

17 Claims, 2 Drawing Sheets

METHOD AND APPARATUS FOR IMPLEMENTING A NOISE GENERATOR IN AN INTEGRATED CIRCUIT DISK DRIVE READ CHANNEL

BACKGROUND OF THE INVENTION

1. Field of the Invention

This invention relates to the field of optimizing the performance of signal channels, and, more specifically, to optimizing the performance of integrated circuit disk drive read channels.

2. Background Art

Computer systems employ data storage devices, for example, disk drives, to store data for use by the computer system. A typical data storage device includes storage media, in which data is stored, a read head, and a mechanism, such as a motor, for imparting relative motion between the storage media and the read head. The relative motion allows access to various portions of the storage media, and, in the case of certain types of media, such as magnetic media, allows for the production of signals representative of the data stored in the storage media.

In general, disk memories are characterized by the use of one or more magnetic media disks mounted on a spindle assembly and rotated at a high rate of speed. Each disk typically has two surfaces of magnetic media. In a typical rotating medium as a storage system, data is stored on magnetic or magneto-optical disks in a series of concentric "tracks," with each track being an addressable area of the memory array. A read-write head is provided for each surface of each disk in the disk storage system. These tracks are accessed by a read-write head that detects variations in the magnetic orientation of the disk surface.

To provide retrieval of stored data from a storage medium, the fixed representation of the stored data in the storage medium must be converted into a signal that may be processed to yield data in a form usable with a system such as a computer system. A read channel circuit is used to convert signals from the storage media, for example a hard disk, to usable read data. A read channel circuit typically includes a pulse detector, a filter, servo circuits, a data synchronizer, a window shift circuit, a write precompensation circuit, an encoder/decoder (ENDEC), and a control circuit. The pulse detector detects and qualifies encoded read signals derived from the storage device. The filter further processes the encoded read signals to ensure frequency range and phase relationships of the encoded read signals are appropriate to allow read data to be recovered from the encoded read signals. The servo circuits capture servo information derived from the storage device which is used to assure that data to be read from the storage device has been accurately located.

In the read mode, the data synchronizer performs sync field search and data synchronization. The data synchronizer uses a phase locked loop (PLL) to provide data synchronization and to develop a decode window. The window shift circuit shifts the phase of the voltage controlled oscillator (VCO) of the PLL to effectively shift the relative position of the read data pulse within the decode window. In the write mode, the write precompensation circuit uses the data synchronizer to provide data encoding and independent late/early write precompensation for NRZ data. The ENDEC provides encoding and decoding, preferably of run length limited (RLL) signals. The control circuit coordinates and controls the operation of the aforementioned circuits and subsystems.

The trend towards higher storage media recording density and higher data rates has placed heavy demands on the signal detection process in a magnetic recording channel. Information is often provided to a read channel in a bit stream format. A bit stream consists of a series of logical ones or zeros presented in serial fashion. To accurately decode a serial bit stream, the read channel must be able to detect each individual bit. The size of the region on a magnetic recording disk used to represent a single bit has been greatly reduced. This has increased the density of information, and the storage capacity of disk drives. As the magnetic media recording density has increased signal processing techniques have been increasingly used to achieve the accuracy and reliability recording systems require. For example, in the past signal detection in magnetic disk drive read channels was based on peak detection. Peak detection has now been largely replaced by the partial response maximum likelihood (PRML) approach. For a discussion of recent PRML channel developments see G. J. Kerwin, et al., "Performance Evaluation of the Disk Industry's Second-Generation Partial Response Maximum Likelihood Data Channel," IEEE Trans. Magn., Vol. 27, No. 6, 4005 (November 1993). Variations in semiconductor processing techniques produce read channel circuits with varying circuit performance. To compensate for these variations the performance of each read channel is characterized and parameters are adjusted to optimize the channel.

The performance of a signal channel in, for example, a disk drive, is optimized by characterizing the effects of the channel on a signal and defining operating parameters based on that characterization. The optimization process is performed during factory calibration.

The expanded use of signal processing techniques requires that more parameters be determined in the optimization process. For example to optimize an advanced signal read channel may require determining the following signal processing parameters: continuous time cutoff frequency, frequency boost, transversal filter tap coefficients, and detector threshold values. In the past, one way magnetic disk drive read channels have been optimized is by incorporating a mean-squared error (MSE) in the channel electronics, and making bit error rate (BER) measurements of the disk drive. The MSE only provides an indirect measure of the bit error rate performance. This can cause the optimization process to produce less than optimum channel performance. The MSE measures the squared error between the received samples and the ideal target samples. Minimizing the MSE may not minimize the noise bandwidth. This would cause the signal-to-noise ratio to not be maximized, and a higher BER.

The BER is an ideal measure to use to optimize channel performance because it gives the actual performance of the channel. BER measurements are often made with pseudo-random signal patterns. When the BER is low, measuring it takes too much time to be practical. For example, to optimize a hard disk drive with a low BER may take up to five hours. One way to reduce optimization time is to increase the BER. The BER can be increased by adding noise to the test signal. In the production process, injecting noise from an external source is undesirable because it requires providing a connector to an external noise source or opening the drive under test. Providing a connector to an external noise source increases the disk drive manufacturing cost because of the increased production handling costs and additional production equipment. Injecting noise from an external source has the further drawback that the disk drive cannot readily be re-optimized in the field to compensate for component drift. Therefore, it would be desirable to provide a noise source to increase the BER without the drawbacks of the prior art.

SUMMARY OF THE INVENTION

A method and apparatus for implementing a noise generator in an integrated circuit having a read channel to optimize the performance of the read channel is described. The present invention generates noise in an integrated circuit read channel to more efficiently optimize the read channel.

In the preferred embodiment of the present invention, resistors are used as a noise generator. A buffer and pre-amplifier stage isolates the noise generator and amplifies the noise signal. The amplitude of the noise signal is controlled by a programmable multiplier. The multiplier is programmed through a differential current digital-to-analog converter. A filter circuit limits the noise bandwidth. In an alternative embodiment, the filter bandwidth and frequency boost are programmable to vary the noise frequency spectral content. A gate circuit connects and disconnects the noise signal to the channel. A differential current output buffer buffers and interfaces the noise generator sub-circuit to its load.

The signal channel optimization process comprises measuring the performance of the channel and defining parameters to maximize the signal recovery. In the preferred embodiment, the output of the noise generator sub-circuit is summed with a pre-amplified read signal. The noise enhanced read signal then passes through an automatic gain control block and an equalizer before reaching the detector. The generated noise is combined with the read signal to increase the bit error rate. Increasing the bit error rate using an internal noise source allows faster measurement of the bit error rate without having to open the drive under test or connect an external noise source. Hence, the present invention uses an internal noise source to provide a more efficient method and apparatus for optimizing read channels.

DETAILED DESCRIPTION OF THE INVENTION

A noise generator in an integrated circuit for optimizing signal channels is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, one way magnetic disk drive integrated circuit read channels have been optimized is by calculating the mean-squared error. The mean-squared error only provides an indirect measure of the drive's BER; and therefore often produces less than optimum channel performance. Measuring the BER is a more accurate approach because it represents the actual performance of the channel. For low bit error rates measuring the BER is impractical because it takes too much time. Therefore, a fast, cost efficient way to increase the BER is needed that can be used to re-optimize devices in the field.

The present invention avoids the problems of the prior art by implementing a noise generator in an integrated circuit read channel device. To optimize a signal channel without adding noise may take up to five hours. The present invention can reduce this optimization time by a factor of 1000. The present invention is applicable generally to devices in which signal channel variations caused by the manufacturing process significantly affect the signal quality. Examples of devices that may be improved by using the present invention include: modems, tape drives, magneto-optical drives, and disk drives.

In the present invention a thermal noise source is provided in an integrated circuit that has a read channel. This avoids the problems associated with an external noise source caused by having to open the device being manufactured, or having to make an external connection to a noise source. The circuit uses the thermal noise of resistors as the noise source. The noise source is buffered and the noise is amplified by a pre-amplifier. A multiplier controls the amplitude of the noise. A digital-to-analog converter (DAC) controls the multiplication factor of the multiplier. The multiplier control input is exponential so that the DAC controls the noise level in log decibel (dB) steps. A gate circuit is used as a switch to open and close the coupling between the multiplier and an output buffer. The output buffer stage provides a buffer and interface to the noise generator load.

Figure 1:
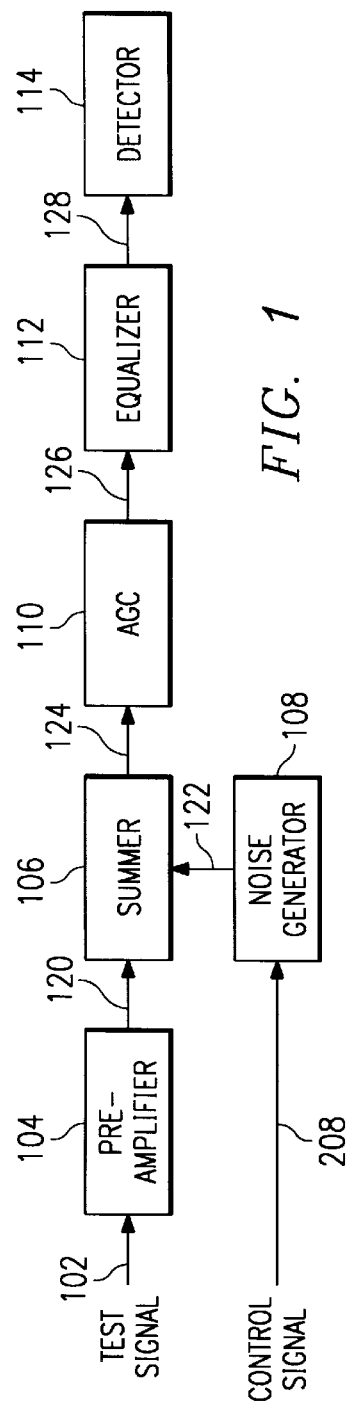
FIG. 1 is a block diagram of a noise generator connected to a signal channel.

FIG. 1 is a block diagram illustrating how the noise generator of the present invention is connected to a signal channel. A test signal 102 is coupled to pre-amplifier 104. Pre-amplifier 104 is coupled through node 120 to summer 106. Noise generator 108 is coupled through node 122 to summer 106. Summer 106 is coupled through node 124 to Automatic Gain Control (AGC) 110. AGC 110 is coupled through node 126 to equalizer 112. Equalizer 112 is coupled through node 128 to detector 114.

The test signal 102 may originate from a magnetic storage media, for example a magnetic disk read back head. Pre-amplifier 104 amplifies the test signal 102 and provides a pre-amplified output through node 120 to summer 106. The test signal is combined with the output of the noise generator 108 in summer 106. In the preferred embodiment, noise generator 108 is in a signal channel integrated circuit. In an alternative embodiment noise generator 108 could be in a separate integrated circuit, but where noise generator 108 and the signal channel are still inside of a single device, for example a disk drive. The noise generator output is summed with the pre-amplified test signal 102 before the AGC 110 and channel equalizer 112 so that the channel performance can be calibrated as a function of the equivalent input signal-to-noise ratio. The AGC 110 amplifies the test signal 102 to a predetermined amplitude independent of the amplitude of the test signal 102 input to the AGC. The AGC 110 compensates for variations in the read signal amplitude. For example, disk drive inside-track-to-outside-track amplitude tolerances. Equalizer 112 narrows the signal pulse which is representative of a bit. The equalizer 112 enhances the detector's 114 ability to distinguish pulses from noise. The test signal 102 is then detected by detector 114 and is compared with a test pattern to evaluate the performance of the signal channel.

Figure 2:
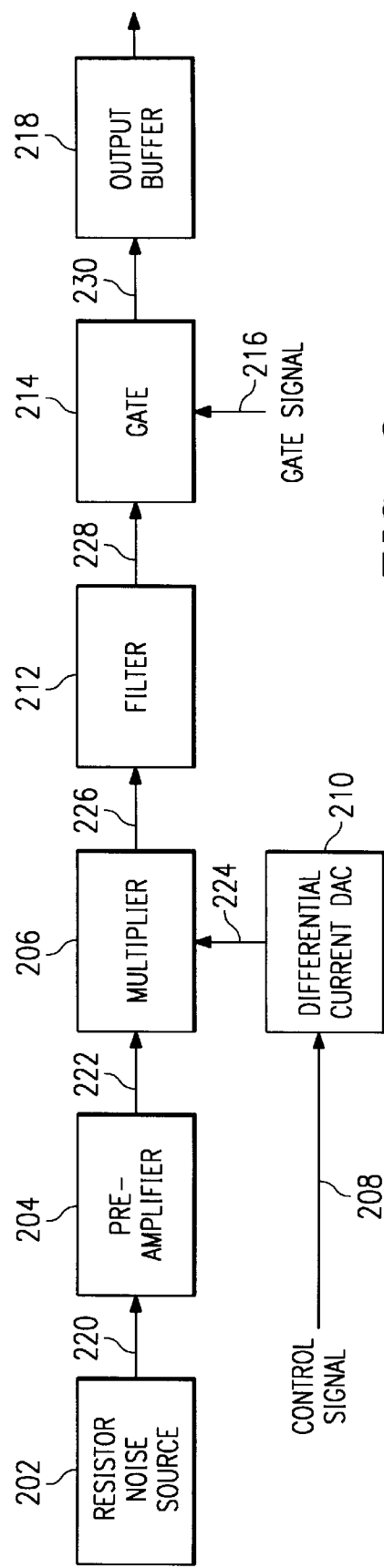
FIG. 2 is a block diagram of a noise generator according to the present invention.

FIG. 2 is a block diagram of the noise generator. Resistor noise source 202 is coupled through node 220 to pre-amplifier 204. Pre-amplifier 204 is coupled through node 222 to multiplier 206. Control signal 208 is coupled through node 208 to differential current DAC 210. Differential current DAC 210 is coupled through node 224 to multiplier 206. Multiplier 206 is coupled through node 226 to filter 212. Filter 212 is coupled to gate 214 through node 228. Gate 214 is coupled through node 230 to output buffer 218.

Resistor noise source 202 generates a noise signal. Preamplifier 204 amplifies the noise signal. Multiplier 206 is a programmable multiplier controlled through node 224 by differential current DAC 210. Differential current DAC 210 is in turn controlled by control signal 208. Hence, multiplier 206 allows a user to program the amplitude of the noise signal. Filter 212 limits the noise bandwidth. In an alternative embodiment, the filter bandwidth and frequency boost are programmable to vary the noise frequency spectral content. Gate 214 is controlled by gate signal 216. Gate 214 is used to connect and disconnect the noise signal to the channel. The noise source can also be turned off by removing the circuit bias voltages.

Figure 3:
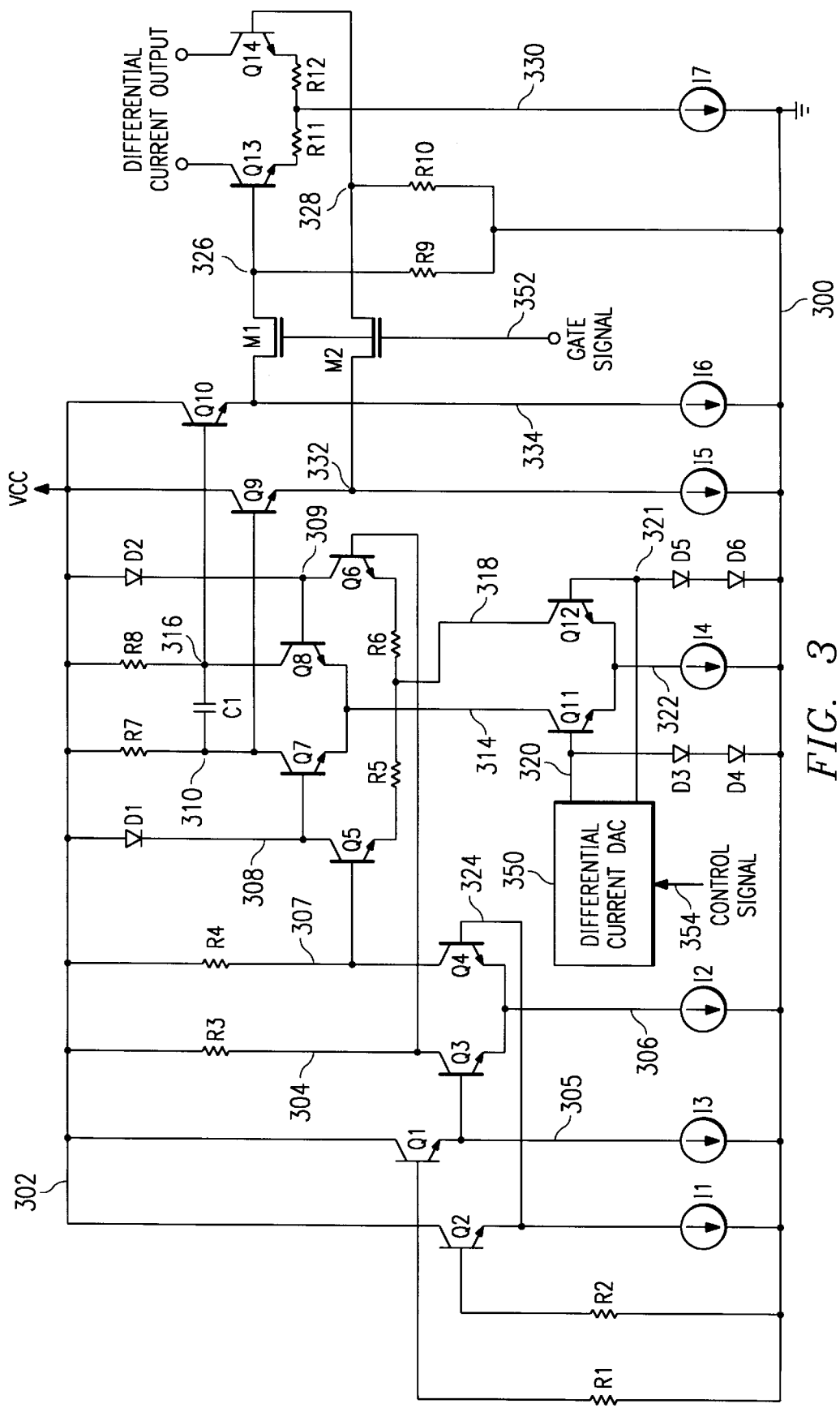
FIG. 3 is a schematic diagram of the preferred embodiment of the noise generator component of the present invention.

FIG. 3 is a schematic diagram of the preferred embodiment of the noise generator component of the present invention. Resistors R1 and R2 are an example of a noise generating means. R1 and R2 primarily generate thermal noise caused by the random motion of electrons due to thermal agitation. The resistors exhibit electrical noise in the form of small ac voltage fluctuations when a dc voltage is applied to them. The noise the resistors generate is a function of the applied voltage, the physical dimensions of the resistors, and their material composition. The thermal noise has a mean-square value (i.e. average power) given by the equation:

$$e_n^2 = 4kRT(f_2 - f_1)$$

k=Boltzman's constant (1.38×10*23 W·s)
T=resistor temperature in degrees Kelvin
R=resistance in ohms
$f_2 - f_1$=noise bandwidth in hertz This resistor noise (a.k.a. "Johnson noise") is "white" noise, since its root-mean-square value per unit bandwidth is constant from dc to high frequencies. Other noise generating means besides resistors can be used. For example, alternative noise generating means include, diodes, Bipolar Junction Transistors (BJTs), and Field Effect Transistors (FETs).

Transistors Q1, Q2, Q3, Q4, resistors R3, R4, and current sources I1, I2 and I3 form a buffer and pre-amplifier stage. Resistor R1 is coupled to the base of transistor Q1. The collector of transistor Q1 is coupled to VCC through node 302. The emitter of transistor Q1 is coupled to current source I3 through node 305. Resistor R2 is coupled to the base of transistor Q2. The collector of transistor Q2 is coupled to VCC through node 302. The emitter of transistor Q2 is coupled to current source I1 through node 324. Current sources I1 and I3 are coupled to ground through node 300. In an alternative embodiment, I3 is a proportional to absolute temperature (PTAT) current source.

Transistors Q3 and Q4 form an emitter-coupled pair. The emitter of transistor Q1 is coupled to the base of transistor Q3 through node 324. The collector of transistor Q3 is coupled to resistor R3. Resistor R3 is coupled to VCC through node 302. The emitter of transistor Q3 is coupled to current source I2 and the emitter of transistor Q4 through node 306. Current source I2 is coupled to ground through node 300. The emitter of transistor Q2 is coupled to the base of transistor Q4. The collector of transistor Q4 is coupled to resistor R4 through node 307. Resistor R4 is coupled to VCC through node 302.

Transistors Q5, Q6, Q7, Q8, Q9, Q10, Q11, Q12, diodes D1, D2, resistors R5, R6, R7, R8, and current sources I4, I5, and I6 comprise a "Gilbert Multiplier Cell." Generally Gilbert Multiplier Cells take two analog inputs and produce an output proportional to their product. Here, diodes D3, D4, D5, and D6 with transistors Q11 and Q12 form a control section of the multiplier that produces an exponential output dependence on the differential current DAC control signal 354. The multiplier control section is relatively temperature independent. For a detailed discussion of a related temperature compensation control circuit for an exponential gain function see U.S. Pat. No. 5,162,678 Yamasaki. Multiplication (gain) control is provided from the differential current DAC. One Gilbert Cell Multiplier input is formed by nodes 307 and 304, and the other input is formed by nodes 320 and 321. The Gilbert Cell Multiplier output is formed by nodes 310 and 316.

Transistors Q5 and Q6 form an emitter-coupled pair. The base of transistor Q5 is coupled to the collector of transistor Q4 through node 307. The collector of transistor Q5 is coupled to diode D1 and to the base of transistor Q7 through node 308. Diode D1 is coupled to VCC through node 302. The emitter of transistor Q5 is coupled to resistor R5. The base of transistor Q6 is coupled to the collector of transistor Q3 through node 304. The collector of transistor Q6 is coupled to diode D2 and to the base of transistor Q8 through node 309. Diode D2 is coupled to VCC through node 302. The emitter of transistor Q6 is coupled to R6.

Transistors Q7 and Q8 form an emitter-coupled pair. The emitters of transistors Q7 and Q8 are coupled through node 314. The collector of transistor Q7 is coupled to resistor R7, capacitor C1, and to the base of transistor Q9 through node 310. Resistor R7 is coupled to VCC through node 302. The collector of transistor Q8 is coupled to resistor R8, capacitor C1, and to the base of transistor Q10 through node 316. Resistor R8 is coupled to VCC through node 302. The collectors of transistors Q9 and Q10 are coupled to VCC through node 302.

Diodes D3, D4, D5, and D6 with transistors Q11 and Q12 form the control section of the Gilbert Multiplier Cell. Transistors Q11 and Q12 form an emitter-coupled pair. The collector of transistor Q11 is coupled to the emitters of transistors Q7 and Q8 through node 314. The collector of transistor Q12 is coupled to resistors R5 and R6 through node 318. The base of transistor Q11 is coupled to differential current DAC 350, and to diode D3 through node 320. Diode D3 is coupled to diode D4. Diode D4 is coupled to node 300. The base of transistor Q12 is coupled to differential current DAC 350 and diode D5 through node 321. Diode D5 is coupled to diode D6. Diode D6 is coupled to ground through node 300. The emitters of transistors Q11 and Q12 are coupled to current source I4 through node 322. Current source I4 is coupled to ground through node 300. The emitter of transistor Q9 is coupled to current source I5 through node 332. The emitter of transistor Q10 is coupled to current source I6 through node 334. Current sources I5 and I6 are coupled to ground through node 300.

Field Effect Transistors (FETs) M1 and M2 form a gate to open and close the coupling between the Gilbert Cell Multiplier and the output buffer stage. The drain of FET M1 is coupled to the emitter of transistor Q10 through node 334. The drain of FET M2 is coupled to the emitter of transistor Q9. The gates of FETs M1 and M2 are coupled to gate signal 352, which is used to turn the gates on and off.

Resistors R9, R10, R11, R12, transistors Q13, Q14, and current source I7 form the output buffer. The source of FET M1 is coupled to resistor R9 through node 326. The source of FET M2 is coupled to resistor R10 through node 328. Resistors R9 and R10 are coupled to ground through node 300. Transistors Q13 and Q14 form an emitter-coupled pair. The base of transistor Q13 is coupled to the source of FET M1 through node 326. The base of transistor Q14 is coupled to the source of FET M2 through node 328. The emitter of transistor Q13 is coupled to resistor R11. The emitter of transistor Q14 is coupled of resistor R12. Resistors R11 and R12 are coupled to current source I7 through node 330. Current source I7 is coupled to ground through node 300. The collectors of transistor Q13 and Q14 form a differential current output. In the embodiment shown in FIG. 2, the differential current output is coupled to summer 106 through node 122.

The Gilbert Multiplier Cell, gate, and output buffer are an example of a control means for controlling the noise level that is coupled to the signal channel. The control means may generally be implemented using some form of an amplifier and control signal.

Thus, a method and apparatus for implementing a noise generator in an integrated circuit having a signal channel has been described.

We claim:

1. An integrated circuit noise generator comprising:

a generating circuit for generating a noise signal to optimize a signal channel, a control circuit for controlling said noise signal with a noise frequency spectrum of said noise, and a signal channel;

said generating circuit coupled to said control circuit;

said control circuit coupled to said signal channel;

said generating circuit and said signal channel being part of a single device.

2. The apparatus of claim 1 wherein said generating circuit and at least part of said signal channel are part of a single integrated circuit.

3. The apparatus of claim 2 wherein said signal channel is an integrated circuit disk drive read channel.

4. The apparatus of claim 3 wherein said control circuit comprises:

a pre-amplifier, a multiplier, a differential current digital-to-analog converter, and a filter;

said pre-amplifier coupled to said generating circuit;

said multiplier coupled to said pre-amplifier;

said differential current digital-to-analog converter coupled to said multiplier; and said filter coupled to said multiplier.

5. The apparatus of claim 4 wherein said control circuit further comprises:

a gate;

said gate coupled to said filter and said signal channel so that when said gate is off said noise signal is isolated from said signal channel, and when said gate is on said noise signal can pass through to said signal channel.

6. The apparatus of claim 5 wherein said generating circuit comprises at least one resistor, and said noise signal is primarily thermal noise.

7. A method for generating noise to optimize a signal channel on an integrated circuit comprising the steps of:

generating a noise signal for said signal channel, using a noise generator, wherein said noise signal is generated in a device which includes said integrated circuit with said signal channel;

controlling said noise signal with a noise frequency spectrum of said noise signal;

combining said noise signal with a test signal;

transmitting said noise signal and said test signal to said signal channel; and evaluating said test signal to optimize said signal channel.

8. The method of claim 7 wherein said step of generating a noise signal to optimize a signal channel comprises:

generating a noise signal and transmitting said noise signal to said signal channel, wherein said noise signal is generated on said integrated circuit with said signal channel.

9. The method of claim 8 wherein said step of generating a noise signal to optimize a signal channel comprises:

generating said noise signal to optimize an integrated circuit disk drive read channel.

10. The method of claim 9 wherein said step of controlling the amplitude of said noise signal comprises:

pre-amplifying said noise signal;

multiplying said noise signal;

controlling said step of multiplying said noise signal using a differential current digital-to-analog converter; and filtering said noise signal.

11. The method of claim 10 wherein said step of controlling the amplitude of said noise signal further comprises:

controlling said noise signal with a gate, so that when said gate is off said noise signal is isolated from said signal channel, and when said gate is on said noise signal can pass through to said signal channel.

12. The method of claim 11 wherein said step of generating a noise signal comprises using a resistor to generate primarily thermal noise.

13. A system for an integrated circuit disk drive read channel comprising:

an integrated circuit noise generator, a signal channel, and a detection circuit for detecting a test signal;

said integrated circuit noise generator comprising:

a generating circuit for generating a noise signal for a signal channel, and a control circuit for controlling said noise signal with a noise frequency spectrum of said noise signal;

said generating circuit being coupled to said control circuit;

said control circuit being coupled to said signal channel;

said integrated circuit noise generator and said signal channel being part of a single device;

said detection circuit coupled to said signal channel to detect test signals in said signal channel.

14. The system of claim 13 wherein said generating circuit and at least part of said signal device are part of a single device integrated circuit.

15. The system of claim 14 wherein said signal channel is an integrated circuit disk drive read channel.

16. The system of claim 15 wherein said control circuit comprises:

a pre-amplifier, a multiplier, a differential current digital-to-analog converter, and a filter;

said pre-amplifier coupled to said generating circuit;

said multiplier coupled to said pre-amplifier;

said differential current digital-to-analog converter coupled to said multiplier; and said filter coupled to said multiplier.

17. The system of claim 16 wherein said control circuit further comprises:

a gate;

said gate coupled to said filter and said signal channel so that when said gate is off said noise signal is isolated from said signal channel, and when said gate is on said noise signal can pass through to said signal channel.

* * * * *